(12) United States Patent
Lee et al.

(10) Patent No.: US 8,051,411 B2
(45) Date of Patent: Nov. 1, 2011

(54) METHOD FOR COPY PROPAGATIONS FOR A PROCESSOR WITH DISTRIBUTED REGISTER FILE DESIGN

(75) Inventors: Jenq Kuen Lee, Hsinchu County (TW); Chung Ju Wu, Taipei (TW); Sheng Yuan Chen, Kaohsiung (TW)

(73) Assignee: National Tsing Hua University, Hsinchu (TW)

( * ) Notice: Subject to any disclaimer, the term of this patent is extended or adjusted under 35 U.S.C. 154(b) by 1089 days.

(21) Appl. No.: 11/835,828

(22) Filed: Aug. 8, 2007

(65) Prior Publication Data

US 2009/0043620 A1 Feb. 12, 2009

(51) Int. Cl.
*G06F 9/45* (2006.01)
*G06F 9/445* (2006.01)

(52) U.S. Cl. .......... 717/144; 717/142; 717/148
(58) Field of Classification Search .......... 717/140–150
See application file for complete search history.

(56) References Cited

U.S. PATENT DOCUMENTS

| | | | | |
|---|---|---|---|---|
| 4,693,896 A * | 9/1987 | Wheatley et al. | | 424/480 |
| 5,287,490 A * | 2/1994 | Sites | | 717/142 |
| 5,507,030 A * | 4/1996 | Sites | | 717/136 |
| 5,857,097 A * | 1/1999 | Henzinger et al. | | 712/236 |
| 5,973,202 A * | 10/1999 | Sezi et al. | | 564/134 |
| 6,016,399 A * | 1/2000 | Chang | | 717/160 |
| 6,112,317 A * | 8/2000 | Berc et al. | | 714/47 |
| 6,286,135 B1 * | 9/2001 | Santhanam | | 717/146 |
| 6,427,234 B1 * | 7/2002 | Chambers et al. | | 717/140 |
| 6,651,247 B1 * | 11/2003 | Srinivasan | | 717/161 |
| 6,883,165 B1 * | 4/2005 | Blandy et al. | | 717/148 |
| 6,986,131 B2 * | 1/2006 | Thompson et al. | | 717/160 |
| 7,107,568 B2 * | 9/2006 | Cronquist | | 716/103 |
| 7,426,721 B1 * | 9/2008 | Saulpaugh et al. | | 717/144 |
| 7,614,044 B2 * | 11/2009 | Bhansali et al. | | 717/145 |
| 7,730,464 B2 * | 6/2010 | Trowbridge | | 717/140 |
| 7,782,873 B2 * | 8/2010 | Sharma et al. | | 370/395.5 |
| 7,793,273 B2 * | 9/2010 | Mercer et al. | | 717/141 |
| 7,941,460 B2 * | 5/2011 | Bar-Or et al. | | 707/803 |

OTHER PUBLICATIONS

Knerr et al, "task scheduling for power optimisation of multi frequency synchronous data flow graphs", ACM SBCCI, pp. 50-55, 2005.*

Horstmannshoff et al, "Efficient building block based RTL code generation from synchronous data flow graphs", ACM 552-555, 2000.*

Jong, "Data flow graphs: system apecification with most unrestricted semantics", IEEE, pp. 401-405.*

Ghamarian et al, Parametric throughput analysis of synchronous data flow graphs, ACM EDAA, pp. 116-121, 2008.*

(Continued)

*Primary Examiner* — Anil Khatri
(74) *Attorney, Agent, or Firm* — WPAT, P.C.; Anthony King

(57) ABSTRACT

A method for copy propagations of a processor including two clusters, each cluster comprising a first function unit and a second function unit, a first local register file and a second local register file being respectively accessible by the first and second function unit only, and a global register file having a ping-pong structure to access the first and second local register files, the method comprising the steps of: (a) listing possible copy propagation paths between two nodes of a data flow graph; (b) calculating a profit of machine cycles for each of the copy propagation paths according to constraints of the processor; and (c) performing a copy propagation through the copy propagation path if the profit thereof is greater than a threshold value.

10 Claims, 9 Drawing Sheets

OTHER PUBLICATIONS

Mohanty et al, "A model based extensible framework fro efficient application design using FPGA", ACM Trans. design Automation of Elec. Sys. vol. 12, No. 2, article 13, pp. 1-26, 2007.*

Bazargan et al, "Integrating scheduling and physical design into a coherent compilation cycle for reconfigurable computing architectures", ACM DAC, pp. 635-640, 2001.*

* cited by examiner instruction 1 : MOV d2 , a1
instruction 2 : MOV d3 , a3
instruction 3 : ADD d4 , d2 , ac1

⇧ copy propagation instruction 1 : MOV d2 , a1
instruction 2 : MOV d3 , a3
instruction 3 : ADD d4 , a1 , ac1

FIG. 3

METHOD FOR COPY PROPAGATIONS FOR A PROCESSOR WITH DISTRIBUTED REGISTER FILE DESIGN

BACKGROUND OF THE INVENTION (A) Field of the Invention

The present invention relates to a method for copy propagations for a processor, and more particularly, to a method for copy propagations for a Parallel Architecture Core (PAC) processor.

(B) Description of the Related Art

In compiler theory, copy propagation attempts to replace the occurrences of targets of direct assignments with their values. Many researchers have proposed various algorithms to perform copy propagation under a variety of conditions, e.g., to perform data flow-transformation for arrays, to extend this optimization technique to parallel programs, or to generate profile information to assist this classic code optimization. However, without taking inter/intra communication costs into consideration, those propagation schemes do not properly fit into modem digital signal processor (DSP) architecture, e.g., cluster-based architecture, or irregular register files. DSPs have been found widely used in an increasing number of computationally intensive applications in fields such as mobile systems. As communications applications are moving towards conflicting requirements of higher performance and lower power consumption, DSPs have evolved into a style of large computation resources combined with restricted and/or specialized data paths and register storages. In modem DSPs, computation resources are divided into clusters with dedicated local register files to reduce hardware complexity.

Traditional copy-propagation methods applied to processors with cluster-based architectures and irregular register files tend to exhibit high frequencies of improper copy propagations.

SUMMARY OF THE INVENTION

The objective of the present invention is to provide a method for copy propagations with the high efficiency of a PAC processor.

The PAC processor comprises two clusters. Each cluster comprises a first functional unit (LSU), a second functional unit (ALU), a first local register file connected to the first functional unit, a second local register file connected to the second functional unit, and a global register file having a ping-pong structure formed by a first register bank and a second register bank to access the first and second register files. The global register file comprises a single set of access ports including two read ports and one write port shared by the first and second functional units.

The method of the invention comprises the following steps. First, a data flow graph is built. All possible copy propagation paths between two nodes are listed according to the data flow graph. Then, all possible copy propagation paths are imported into a cost-benefit analysis to calculate the profit of machine cycles thereof, i.e., the value subtracting the cost from the gain. A copy propagation is performed through the copy propagation path if the profit of machine cycles is larger than a threshold value, e.g., zero.

The gain of the machine cycles comprises the possible reduced register communication costs on the copy propagation path and the number of all available copy assignments that can be reduced along the copy propagation path. The cost of machine cycles comprises at least one extra cycle caused by a separation of code fragment bundles for the copy propagation due to port constraints of the global register file, an extra copy instruction to move data between the first local register and the second local register on the same cluster, and a pair of communication instructions for data communication between the two clusters.

According to the present invention, the schemes are effective to prevent performance anomalies with copy propagations over embedded VLIW DSP processors with distributed files.

BRIEF DESCRIPTION OF THE DRAWINGS

The objectives and advantages of the present invention will become apparent upon reading the following description and upon reference to the accompanying drawings in which:

FIG. 3 shows an example of copy propagation regarding data access between one local register and another local register;

DETAILED DESCRIPTION OF THE INVENTION

Figure 1:
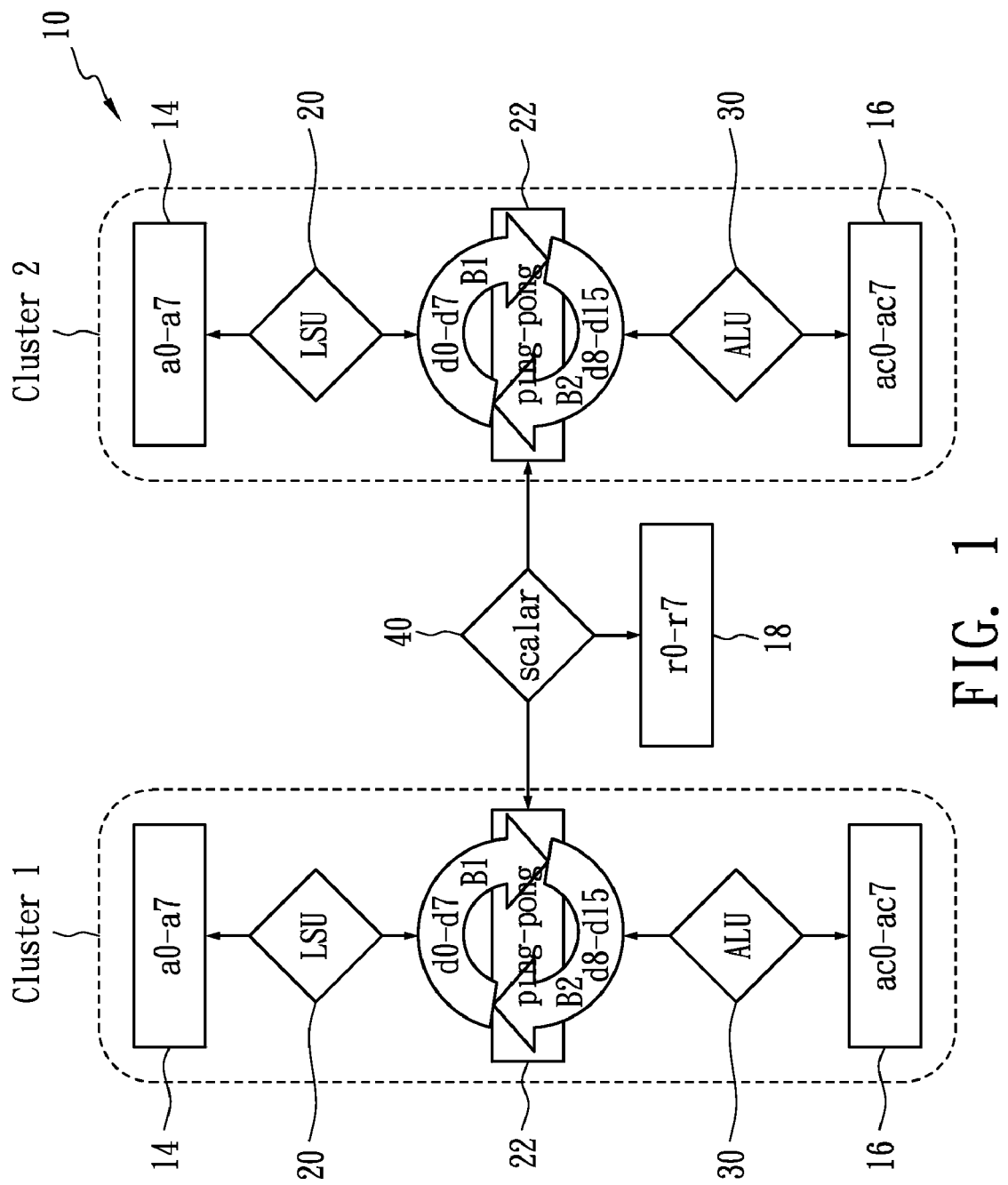
FIG. 1 illustrates the architecture of a PAC processor.

FIG. 1 illustrates the architecture of a Parallel Architecture Core (PAC) processor 10. The PAC processor 10 comprises a Cluster 1 and a Cluster 2, each of Cluster 1 and Cluster 2 comprises a first functional unit 20, a second functional unit 30, a first local register file 14 including register files a0-a7 connected to the first functional unit 20, a second local register file 16 including register files ac0-ac7 connected to the second functional unit 30, and a global register file 22 having a ping-pong structure formed by a first register bank B1 including register files d0-d7 and a second register bank B2 including registers d8-d15. The PAC processor 10 further comprises a third functional unit 40, which is placed independently and outside Cluster 1 and Cluster 2. A third local register file 18 including register files r0-r7 is connected to the third functional unit 40.

The first functional unit 20 is a load/store unit (LSU), the second functional unit 30 is an arithmetic unit (ALU), and the third functional unit 40 is a scalar unit. The third functional unit 40 is in charge of branch operations and also capable of performing simple load/store and address arithmetic. The first local register file 14, the second local register file 16, and the third local register file 18 are accessible only by the LSU 20, ALU 30, and the scalar unit 40, respectively.

The global register files 22 of Cluster 1 and Cluster 2 can be used to communicate across clusters. Each of the global register files 22 has only 3 read ports and 2 write ports. Only the scalar unit 40, being able to access all global register files 22, is capable of executing such copy operations across Cluster 1 and Cluster 2.

Each global register file 22 has only a single set of access ports, shared by the LSU 20 and ALU 30. Each register bank B1 or B2 of the global register file 22 can be accessed only by either the LSU 20 or the ALU 30 in an operation cycle, so these two functional units 20 and 30 access different banks B1 or B2 at a time. This is an access constraint of the ping-pong structure.

Figure 2:
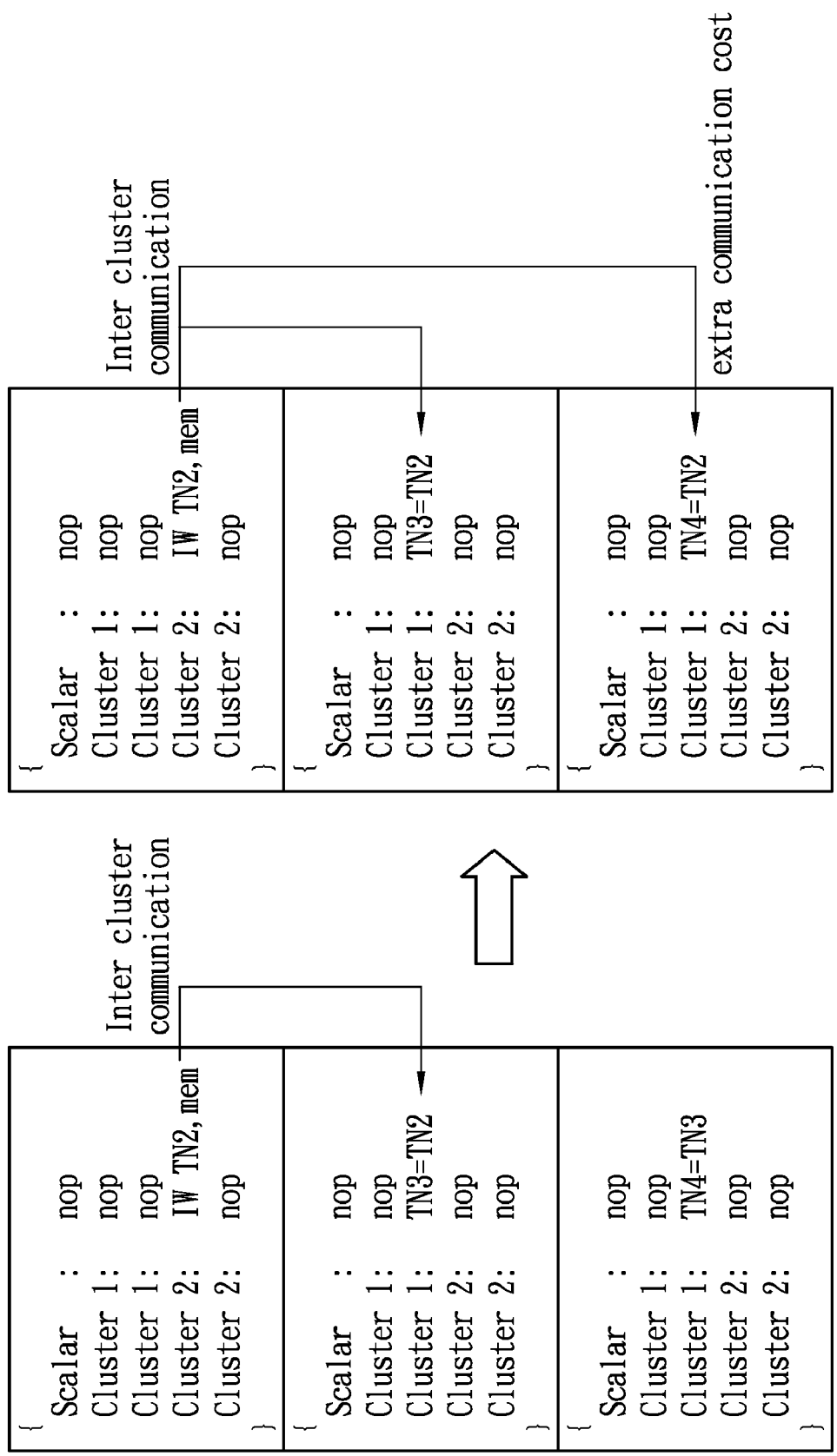
FIG. 2 shows an example of copy propagation regarding inter-cluster communication.

FIG. 2 shows an example of copy propagation regarding inter-cluster communication, i.e., data flow from one cluster to another. In the left code fragment of FIG. 2, there is one inter-cluster communication having a propagation path from Cluster 2 to Cluster 1, i.e., a TN2 (a Temporary Name (TN) represents a virtual register required to be allocated to a physical register in the machine-level intermediate representation used by the Open Research Compiler) is propagated from Cluster 2 to Cluster 1. Because TN4=TN3 and TN3=TN2, TN4 is equal to TN2. Therefore, there are two inter-cluster communications between Cluster 1 and Cluster 2 in this code fragment in the right code fragment. In other words, the PAC processor 10 provides an extra pair of communication costs to finish the data communication from one cluster to another. The cost of the extra pair of communication instructions, i.e., bdt and bdr, is three machine cycles on the PAC processor 10.

FIG. 3 shows an example of copy propagation regarding data access between a local register and another local register, i.e., intra-cluster communication. In instruction 1, an operation MOV d2, a1 reaches the use of d2 in instruction 3. Register a1 belongs to the first local register file 14 and is only accessible by the LSU 20. Register ac1 belongs to the second local register file 16 and is only accessible by the ALU 30. After a copy propagation from instruction 1 to instruction 3, i.e., replacing d2 with a1 in the instruction 3, the compiler must insert an extra copy instruction for the local register access because a functional unit 20 or 30 cannot access the registers a1 and ac1 at the same time. The cost of the extra copy instruction is one machine cycle on the PAC processor 10.

Figure 4A:
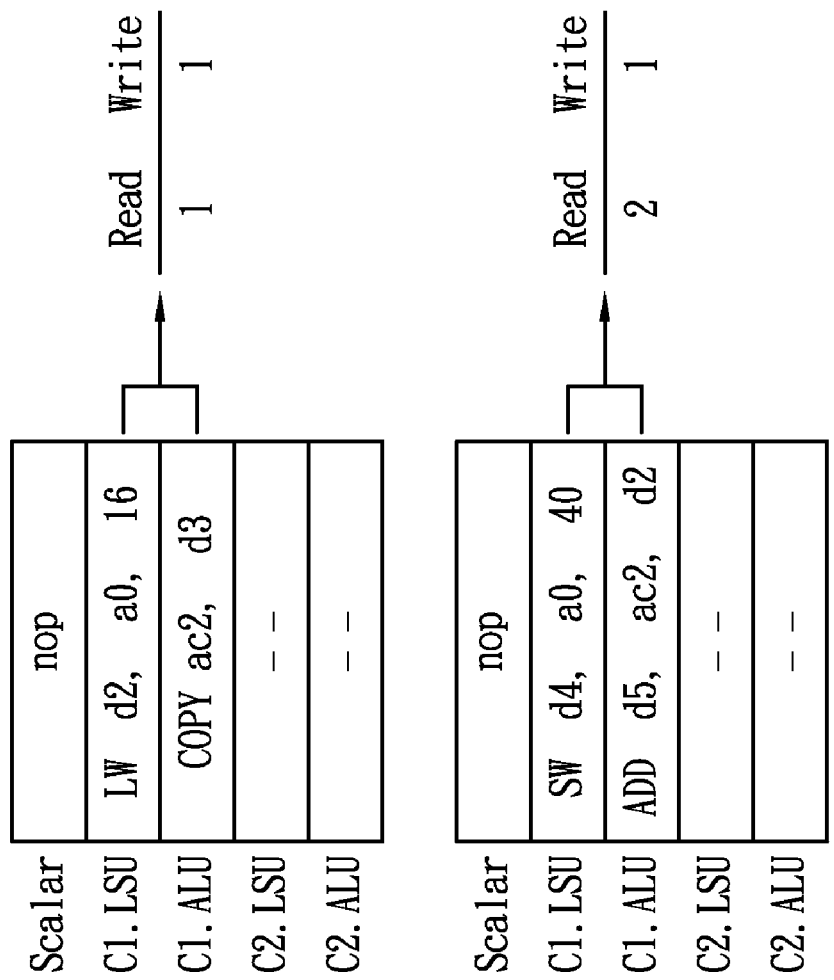
FIGS. 4(a) to 4(c) show an example of copy propagation regarding a port constraint.
Figure 4B:
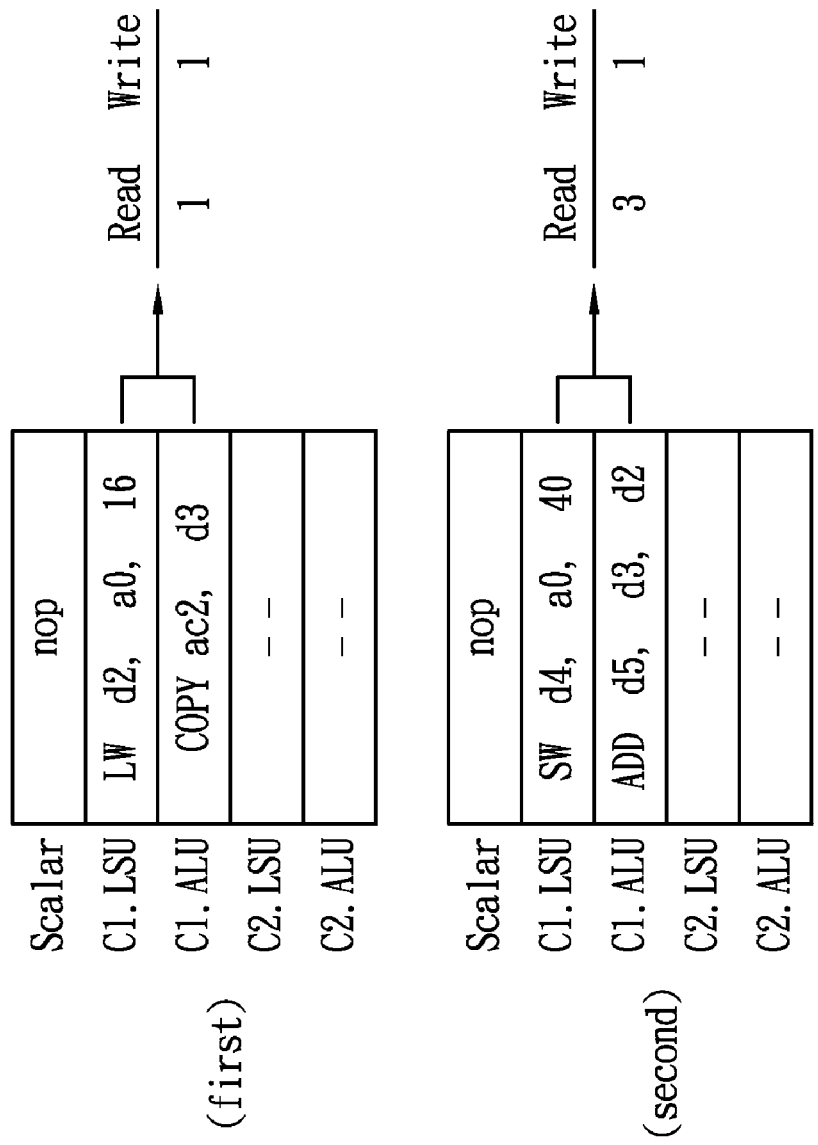
Figure 4C:
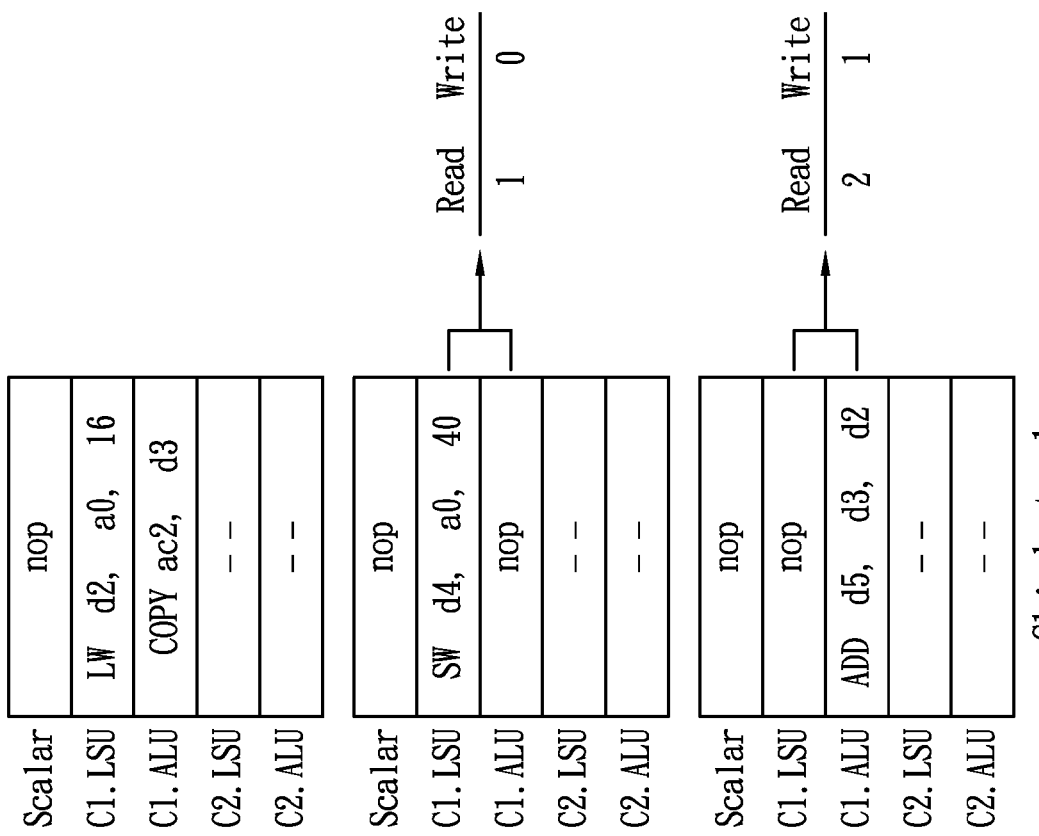

FIGS. 4(a) to 4(c) show an example of copy propagation regarding a port constraint.

Code Fragment 1 is shown as below:

| (1) LW   | d2,  | a0,  | 16 |
|----------|------|------|----|
| (2) COPY | ac2, | d3   |    |
| (3) SW   | d4,  | a0,  | 40 |
| (4) ADD  | d5,  | ac2, | d2 |

FIG. 4(a) illustrates the bundles of Code Fragment 1 and also shows how many read/write ports of the global register file are needed.

After a copy propagation scheme, the compiler replaces register ac2 with d3 in line (4), and the resulting Code is as follows:

Code Fragment 2:

| (1) LW   | d2,  | a0, | 16 |
|----------|------|-----|----|
| (2) COPY | ac2, | d3  |    |
| (3) SW   | d4,  | a0, | 40 |
| (4) ADD  | d5,  | d3, | d2 |

The bundles of Code Fragment 2 after a copy propagation scheme are shown in FIG. 4(b). A read port is needed to read d4 in line (3), and two read ports are needed to read d3 and d4 in line (4), i.e., there are three read ports needed in the second bundle. However, the global register file 22 has only two available read ports and one available write port, so the compiler has to reschedule the Code Fragment 2 according to the register port constraint. Due to the port constraint, the second bundle of FIG. 4(b) is separated into two isolated ones as shown in FIG. 4(c), in which line (3) and line (4) of Code Fragment 2 are read at different times. While d4 is being read, Cluster 1.ALU is no operation (nop), and d2 and d3 are being read sequentially with no operation in Cluster 1.LSU. Accordingly, only one read port is needed while d4 is being read, and only two read ports are needed when d3 and d2 are being read. The cost of an extra bundle is one machine cycle on the PAC processor 10.

As mentioned above, a naive application of the data flow analysis scheme to programs on PAC DSP may actually increase the execution cycles due to increased memory accesses, register pressure, or separating of bundles. In the following discussions, the cost models of the invention are introduced first, and an algorithm based on the models to guide the analysis process to avoid performance anomaly issues can be developed accordingly.

The cost models for data flow analysis are to model the total costs which are spent and the total gains realized. Several attributes for evaluating the costs and gains of data propagation are defined. The total weights of the data flow path are the costs of propagation from the TN n of instruction p to the TN m of instruction q. Note that a TN (Temporary Name) of register type is referred as a virtual register required to be allocated to a physical register in the machine level IR used in compilers.

A cost equation is built to evaluate the extra communication costs of data propagation from a circle node (variable) n to another circle node m. The cost equation is defined as equation (1) below:

$$\text{Cost}(n,m) = \text{PP}(n,m) + \text{RP}(n,m) + \text{CBC}(n,m) \quad (1)$$

The PP (n, m) shows the port pressure caused by data flows from the variable n to the variable m, i.e., PP (n, m) is the extra cycles caused by the separation of bundles, and is defined as equation (2) below.

$$PP(n, m) = \left[\frac{k_r - p_r}{p_r}\right] + \left[\frac{k_w - p_w}{p_w}\right] \quad (2)$$

where $k_r/k_w$ is the number of read/write ports needed after data flows from variable n to variable m, and $p_r/p_w$ is the number of read/write port constraint. $k_r$, $k_w$, $p_r$, and $p_w$ need to be calculated according to the instruction types of p and q, respectively.

RP (n, m) represents the register pressure caused by data access between one local register and another local register. Due to the distributed register file constraint, an extra copy instruction is needed to move data from one local register to another temporary register. Therefore, RP (n, m) is the extra need of instruction cycles due to the register pressure. In fact, data access between two different local register types will also increase the extra use of registers.

CBC (n, m) represents the cost of memory access cycles. PAC DSP provides a pair of special instructions (bdt and bdr) to finish the job of data broadcast from one cluster to another. Table 1 shows the corresponding cost functions used in each kind of data flow path. In this table, PP, RP, and CBC represent the three kinds of performance anomaly issues mentioned above. Each of Cluster 1 and Cluster 2 comprises a local register A for data movement units, a local register AC for ALU, and a global register D serving as a ping-pong register to be interleaved between ALU and LSU. There are two cluster registers in accordance with the present invention, so communication formulas are given for different type of registers.

TABLE 1

| Data Flow | Cluster1.D | Cluster1.A | Cluster1.AC | Cluster2.D | Cluster2.A | Cluster2.AC |
|---|---|---|---|---|---|---|
| Cluster1.D | — | PP | PP | CBC | CBC | CBC |
| Cluster1.A | — | — | RP | CBC | CBC | CBC |
| Cluster1.AC | — | RP | — | CBC | CBC | CBC |
| Cluster2.D | CBC | CBC | CBC | — | PP | PP |
| Cluster2.A | CBC | CBC | CBC | — | — | RP |
| Cluster2.AC | CBC | CBC | CBC | — | RP | — |

Table 2 illustrates the extra instructions inserted and computing resources needed in different data flow types.

TABLE 2

| Data flow | Instruction | Computing Resource |
|---|---|---|
| PP(n, m) | nop | — |
| RP(n, m) | copy | register |
| CBC(n, m) | bdt/bdr | memory |

The total gains are the reduced communication codes and the reduced copy assignments from propagations between a circle node n to another circle node m. The gain is defined as equation (3) below:

$$\text{Gain}(n, m) = RCC(n, m) + \sum_{j \in path(n,m)} ACA(c[j]) \quad (3)$$

RCC(n, m) represents the possible reduced register communication costs on this n-m path if the assignment is done directly instead of going through a sequence of copy propagations. ACA(c[j]) is the function to calculate the number of all available copy assignments which can be reduced along this n-m data flow path, c[j] is the intermediate copy assignment on n-m path, and path(n, m) denotes the set of intermediate nodes in the flow path from node n to node m.

The entire process can be performed in an enhanced data flow algorithm including weight evaluation and the data flow selection.

The first step of the enhanced data flow algorithm is to find out the concerned nodes of a propagation path from node n to node m. The nodes form an acyclic data flow tree. The second step evaluates the initial weight of each edge (i, j). By the 2nd step we can calculate the initial weight of this n-m path. The initial weight can be estimated by Gain(n, m) since they tell the same cost but from different views. In the third step, the cost and gain are calculated in accordance with equation (1) and equation (3) to check for any available shortcuts. Note that the gains represent both the communication cost and the available copy assignments that can be saved by taking a particular shortcut, and the costs show the extra inter/intra cluster costs on this shortcut. The cost and gain calculation is iterated several times over this tree graph. If the best profit solution to the propagation path finding problem occurs on the k-th iteration, the paths use only vertices numbered n to k.

Moreover, if multiple nodes have the same ancestors, they should share the weights and gains from their ancestors on a propagation tree. In the first step, the issue for shared edges is taken into account in connection with which one of the path is performing copy propagation, but the other path does not. In that case, the intermediate assignment will not be eliminated by dead code eliminations. This can still be done, but this should be reflected in our cost model for ACA gain calculated in equation (3).

In second step, if there are shared edges, the gains of copy propagations should be counted only once (or the benefit needs to be distributed among shared paths). A reference counting scheme can be used to see the amount of sharing. This information can then be used to re-adjust the cost model for ACA gains in equation (3).

The value subtracting the cost from the gain of the path(n, m) is defined as Profit(n, m) as shown on equation (4):

$$\text{Profit}(n,m) = \text{Gain}(n,m) - \text{Cost}(n,m) \quad (4)$$

If the value of the Profit(n, m) is greater than a threshold value, the path(n, m) is deemed to have profit to be subjected to copy propagations.

Figure 5:
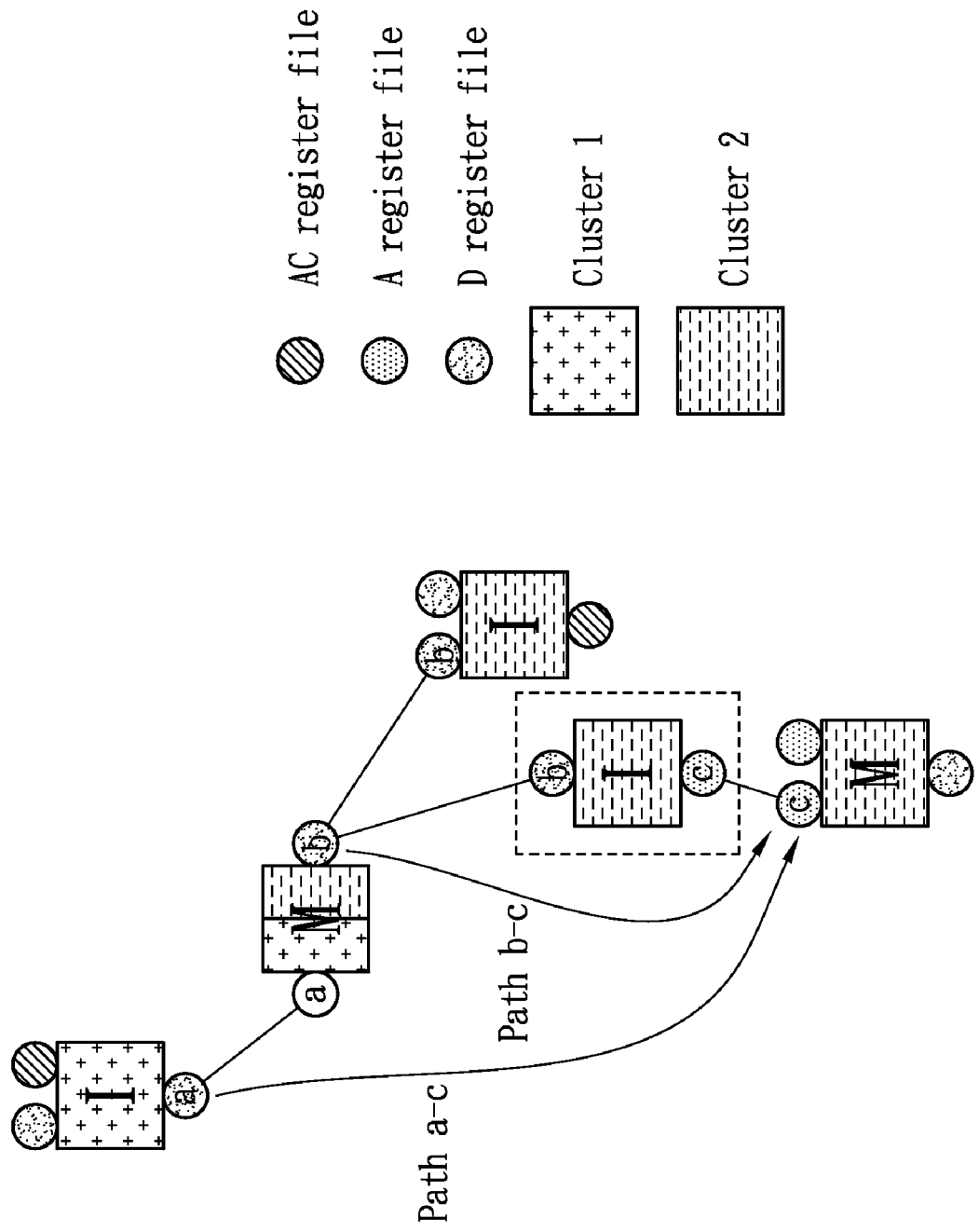
FIGS. 5 and 6 illustrate two examples for Profit calculations.

FIG. 5 illustrates an example for the calculation of Cost and Gain, in which a data flow graph is built and comprises rectangles, circle nodes and edges. After allocating registers for the PAC processor 10, each rectangle is labeled with a functional unit and represents an operator, each circle node indicates what type of register file is allocated and represents an operand, and each edge connected between two of the circle nodes indicates data dependency therebetween. LSU is denoted by M and ALU is denoted by I. The "a" in Cluster 1 is subjected to an inter-cluster communication to be "b" in Cluster 2, and is copied to be "c" between local register files I and M through an intra-cluster communication. Accordingly, the path a-c can avoid an intra-cluster communication cost, thus Gain=1. However, bdt and bdr are further needed for the extra inter-cluster communication, so Cost=3 because bdt and bdr have three machine cycles. Consequently, Profit of path a-c is −2, (Profit$_{a-c}$=Gain−Cost=1−3=−2). The path b-c can avoid an intra-cluster communication cost, thus Gain=1, and Cost=0, so that Profit$_{b-c}$=Gain−Cost=1−0=1. Therefore, path b-c has profit to be subjected to copy propagation.

Figure 6:
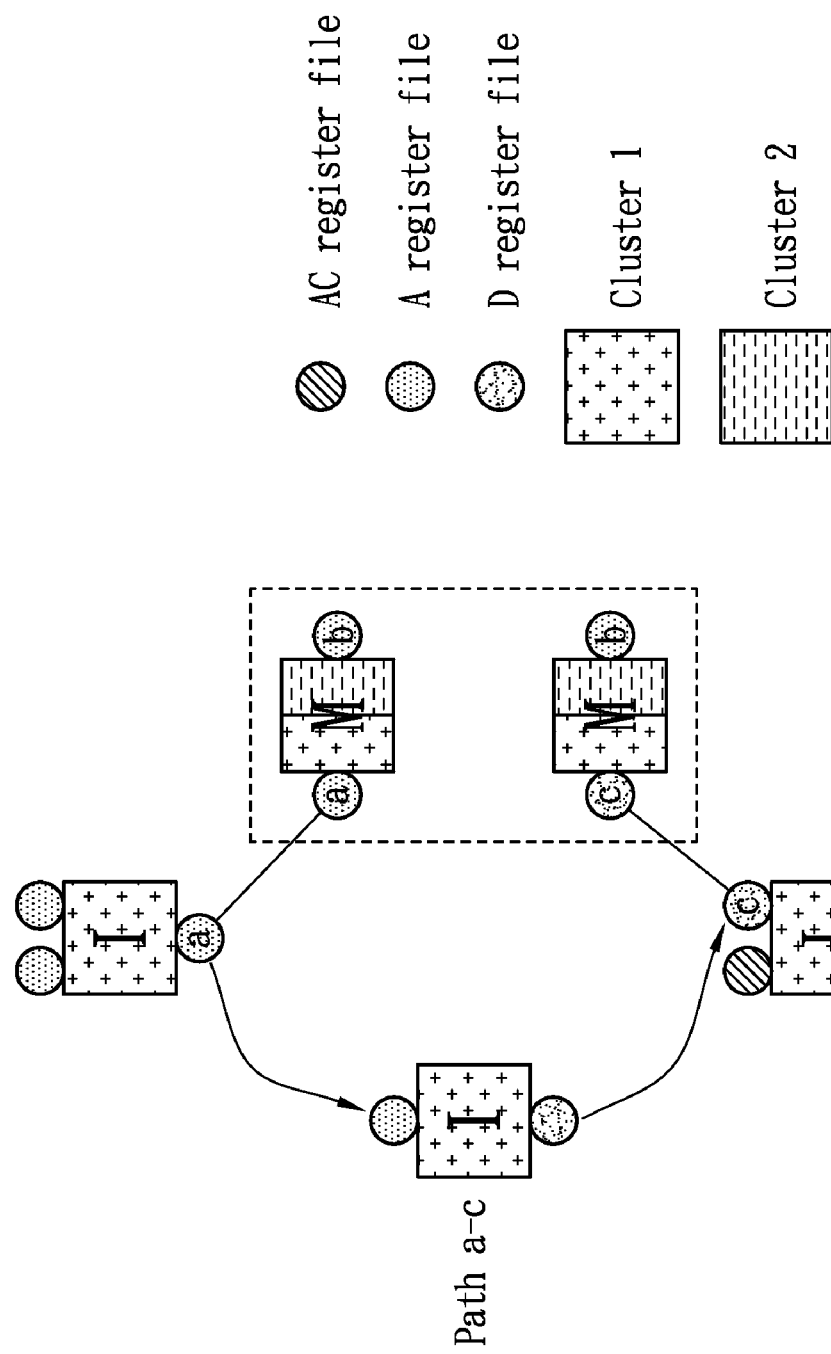

FIG. 6 illustrates another example for the calculation of Cost and Gain, "a" is subjected to an inter-cluster communication to be "b" from Cluster 1 to Cluster 2 and is subjected to another inter-cluster communication from Cluster 2 back to Cluster 1. Then, "c" is copied between local register files M and I through an intra-cluster communication. Accordingly, the path a-c can avoid two sets of bdt and bdr, thus Gain=2× 3=6. However, because A register file is only accessible by M-unit, I-unit in the path a-c needs an intra-cluster communication, i.e., Cost is equal to 1. Consequently, Profit of path a-c is equal to 5 (Profit$_{a-c}$=Gain−Cost=6−1=5), so the path a-c has profit to be subjected to copy propagation.

Figure 7:
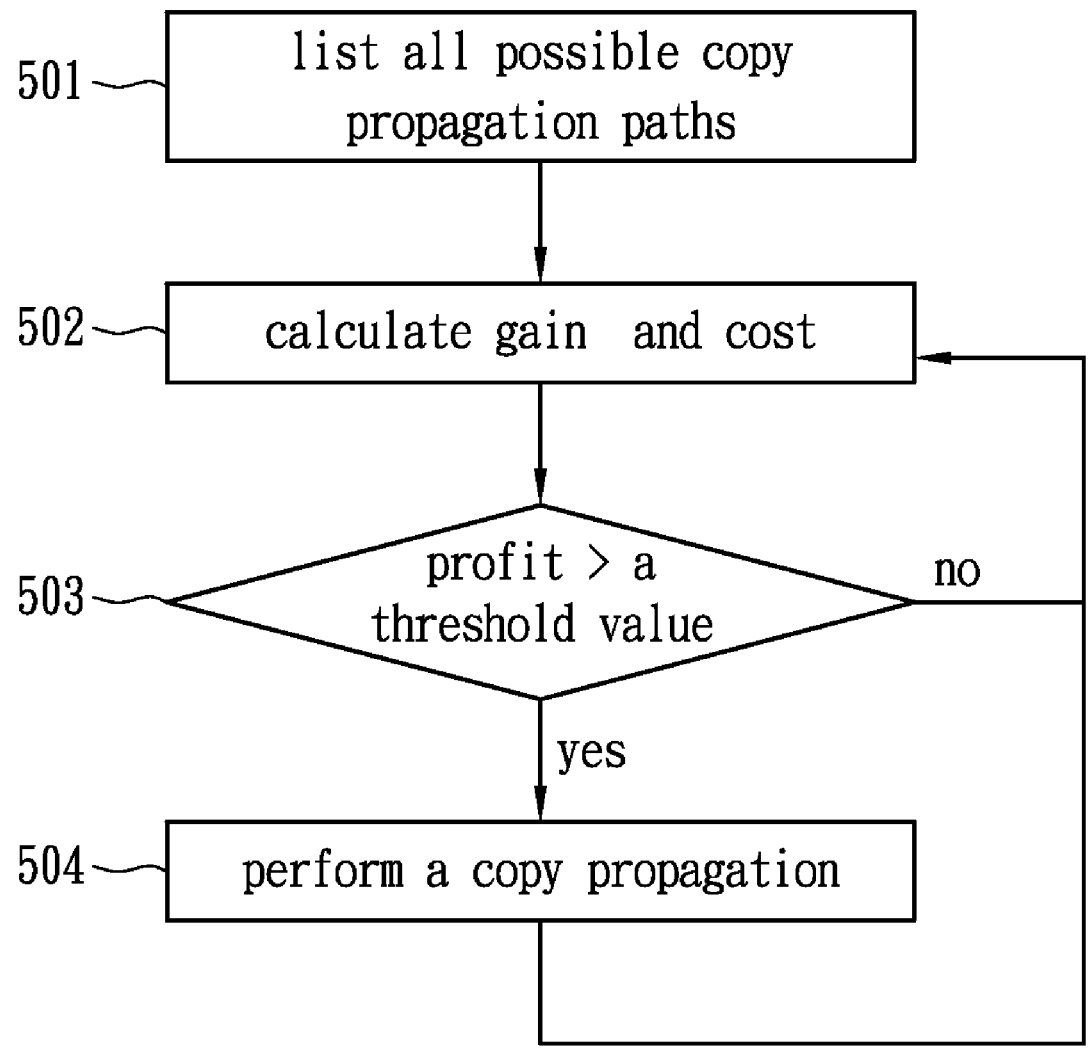
FIG. 7 illustrates a flow chart of the method for copy propagations according to one embodiment of the present invention.

A flow chart of the method for copy propagations according to one embodiment of the present invention is illustrated in FIG. 7. After building a data flow graph, the method comprises the following steps.

First, all possible copy propagation paths are listed according to a data flow graph (step 501). Then, all the nodes in the same copy propagation path are imported into the equations (1) and (3) to calculate gain and cost of machine cycles for the copy propagation path (step 502). Then, the profit is calculated according to equation (4). Whether the profit is greater than a threshold value, e.g., zero, is checked (step 503) for the processing propagation path. Finally, a copy propagation is performed if the processing copy propagation path has profit (step 504). The steps (502) to (504) are repeated until all the copy propagation paths are processed.

The above-described embodiments of the present invention are intended to be illustrative only. Numerous alternative embodiments may be devised by those skilled in the art without departing from the scope of the following claims.

What is claimed is:

1. A method for copy propagations, applied to a processor with distributed register file design, the method comprising the steps of:
    (a) providing the distributed register file architectures, which include two clusters, each cluster comprising a first function unit and a second function unit, a first local register file and a second local register file being respectively accessible by the first and second function unit only, and a global register file having a ping-pong structure to access the first and second local register files;
    (b) executing possible copy propagation paths between two nodes of a data flow graph, wherein the data flow graph is formed by the first local register file and the second local register file in the two clusters and the global register file;
    (c) calculating a profit of machine cycles for each of the copy propagation paths according to constraints of the distributed register file architectures; and
    (d) performing a copy propagation through the copy propagation path if the profit thereof is greater than a threshold value;
    wherein the profit is the value of subtracting cost of machine cycles from gain of the machine cycles of the propagation path; wherein the gain of the machine cycles comprises a number of available copy assignments which can be reduced along the copy propagation path; and
    wherein gain of the available copy assignments should be counted only once if there are shared edges in the copy propagation path between the two nodes.

2. The method for copy propagations of claim 1, wherein the gain of the machine cycles comprises the possible reduced register communication costs on the copy propagation path.

3. The method for copy propagations of claim 1, wherein the cost of machine cycles comprises at least one extra cycle caused by a separation of code fragment bundles for the copy propagation.

4. The method for copy propagations of claim 3, wherein the cost of an extra bundle is a machine cycle on the processor.

5. The method for copy propagations of claim 3, wherein the constraints of the processor include the limitation that each global register file has two read ports and one write port.

6. The method for copy propagations of claim 1, wherein the cost of machine cycles comprises an extra copy instruction to move data between the first local register and the second local register on the same cluster.

7. The method for copy propagations of claim 6, wherein the cost of the extra copy instruction is a machine cycle on the processor.

8. The method for copy propagations of claim 1, wherein the cost of machine cycles comprises a pair of communication instructions for data communication between the two clusters.

9. The method for copy propagations of claim 8, wherein the cost of the pair of communication instructions is three machine cycles on the processor.

10. The method for copy propagations of claim 1, further comprising a third function unit for inter-cluster communication between the two clusters.

* * * * *